US005885396A

United States Patent [19]

Weinberg

[11] Patent Number: 5,885,396

[45] **Date of Patent: *Mar. 23, 1999**

[54] WALLCOVERING BORDER AND METHOD

[75] Inventor: David Weinberg, Culver, Ind.

[73] Assignee: D.W. WallCovering, Inc., Culver, Ind.

[ * ] Notice: The term of this patent shall not extend beyond the expiration date of Pat. No. 5,635,007.

[21] Appl. No.: 767,345

[22] Filed: Dec. 16, 1996

Related U.S. Application Data

[60] Division of Ser. No. 420,107, Apr. 11, 1995, Pat. No. 5,635,007, which is a continuation-in-part of Ser. No. 100, 449, Aug. 2, 1993, abandoned.

[51] Int. Cl.$^{6}$ .................................................. B32B 31/00

[52] U.S. Cl. .......................................... 156/247; 156/267

[58] Field of Search .................................. 156/247, 267, 156/71, 574, 577; 428/43, 346, 350, 355

[56] References Cited

U.S. PATENT DOCUMENTS

| | | | |
|---|---|---|---|
| 875,595 | 12/1907 | Overbury | 428/43 |
| 1,095,661 | 5/1914 | Moulton | 242/525.7 |
| 1,098,770 | 6/1914 | Thomas | 242/525.7 X |
| 1,127,448 | 2/1915 | Jullien | 242/525.5 |
| 3,486,957 | 12/1969 | Fish et al. | 242/525 X |
| 3,582,466 | 6/1971 | Quirk | 219/525 X |
| 3,761,675 | 9/1973 | Mason et al. | 219/121.67 |
| 4,782,208 | 11/1988 | Withrow et al. | 219/121.67 X |
| 4,873,417 | 10/1989 | Moriyasu et al. | 219/121.67 X |
| 4,941,183 | 7/1990 | Bruder | 382/8 |
| 5,113,055 | 5/1992 | Kuriyama | 219/121.67 |
| 5,188,305 | 2/1993 | Kitamura | 219/525.3 |
| 5,196,246 | 3/1993 | Kauss et al. | 428/39 |
| 5,200,592 | 4/1993 | Yabu | 219/121.67 |
| 5,240,539 | 8/1993 | Gunzelman et al. | 156/247 X |
| 5,280,869 | 1/1994 | Ricci | 248/309.2 |
| 5,635,007 | 6/1997 | Weinberg | 156/247 |

FOREIGN PATENT DOCUMENTS

| | | |
|---|---|---|
| 0 357 841 | 3/1990 | European Pat. Off. . |
| 40 26 305 | 2/1992 | Germany . |
| 92 03264 | 3/1992 | WIPO . |
| WO93/16879 | 9/1993 | WIPO . |

*Primary Examiner*—James Engel
*Attorney, Agent, or Firm*—Darby&Darby

[57] ABSTRACT

A wallcovering border includes a decorative repeating pattern which is imprinted upon a strip of wallcovering of indeterminate length and which has a substantially straight upper edge. The upper edge is applied in engagement with the corner between the wall and the ceiling to thereby permit application of the border to the wall in a substantially straight strip. A score line is embossed on the wallpaper between the decorative pattern and the upper edge. The portion of the border between the edge and the pattern is removed along the score line after the border is initially positioned on the wall to thereby provide a decorative border having a nonlinear upper edge.

16 Claims, 1 Drawing Sheet

WALLCOVERING BORDER AND METHOD

This is a division of application Ser. No. 08/420,107, filed Apr. 11, 1995, now U.S. Pat. No. 5,635,007 which is a continuation-in-part of U.S. patent application Ser. No. 08/100,449, filed Aug. 2, 1993, now abandoned.

This invention relates to a decorative wallcovering.

Decorative wallcoverings including wallpaper borders have been commonly used on the upper edges of room walls to provide room decoration and may be used either on plain, painted walls or walls which have had another decorative wallcovering applied thereto covering the entire wall. These decorative borders are usually a strip of wallcovering having substantially straight upper and lower edges with a repeating decorative pattern imprinted between the edges. The upper edge is applied against the corner defined between the wall and the ceiling to aline the border on the wall. Heretofore, borders with other than straight edges have not been used, because the processes available for cutting wallpaper heretofore have been unable to economically cut wallpaper in a continuous pattern economically. Furthermore, the straight edge provided in the prior art borders was necessary so that the border could be easily applied to the wall.

The above-identified U.S. patent application Ser. No. 08/100,449 discloses an apparatus and method for cutting wallpaper borders that economically cuts continuous patterns along the length of the wallpaper border. As disclosed in this prior application, a microprocessor controls the spread of the wallpaper borders that passes through the laser cutting device and also operates the laser cutter so that the latter cuts a predetermined path along the length of the wallpaper. The laser cutters can be adjusted to perforate the wallpaper, so that many small perforations provide a score line which may be easily torn. According to present convention, a continuous score line is provided along the decorative pattern of a wallpaper border between a straight edge thereof and the decorative pattern. Accordingly, the straight edge may be used to position the border relative to the line by aligning the straight edge against the corner between the wall and the ceiling. A pressure sensitive adhesive is applied to the side of the border opposite that upon which the decorative pattern is imprinted so that the border may be applied and removed from the wall. Accordingly, the border may be applied to the wall with a straight edge to assure that the border is applied straight because the straight edge engages the corner between the ceiling and the wall. After the border has been applied to the wall, the nondecorative portion of the border between the design and the straight edge is removed by peeling this portion off the wall and tearing it along the score line formed by the laser cutter. Accordingly, the upper edge of the border is nonlinear, which is far more interesting than the straight edge former borders which were applied in engagement with the corner between the ceiling and the wall. If desired, another nonlinear score line may be made between the other straight edge opposite the one applied to the corner between wall and the ceiling. This score line is between the straight edge forming the lower edge of the border and the decorative pattern, so that the lower edge of the border is also nonlinear. Accordingly, the border may be quickly and easily applied in much the same manner that prior art borders have been applied. The strip between the straight edge and the pattern can then be quickly and easily removed, thereby leaving a nonlinear edge which enhances the decorative appeal of the border.

These and other advantages of this present invention will become apparent from the following description, with reference to the accompanying drawings, in which.

Figure 1:
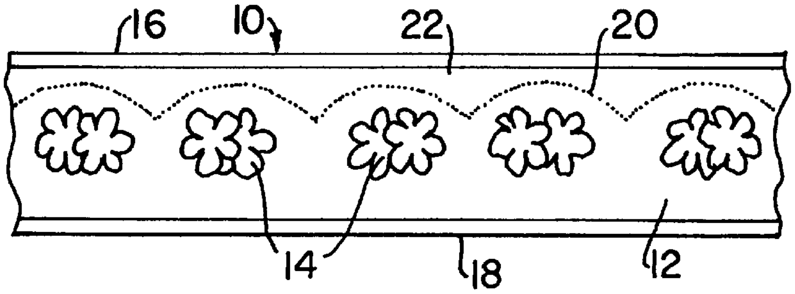
FIG. 1 is a plan view of a wallpaper border of indeterminate length with a perforated score line between the upper edge thereof and the decorative pattern imprinted thereon.
Figure 2:
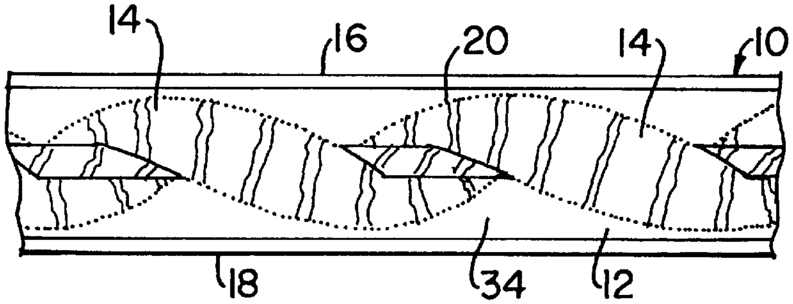
FIG. 2 is a view similar to FIG. 1, but illustrating a different design in which score lines are embossed between both the upper edge and the decorative pattern and the lower edge and the decorative pattern.

Referring now to the drawings, FIG. 1 and FIG. 2 each illustrate a typical wallcovering border generally indicated by the numeral 10. Each of the borders at 10 include a strip of wallcovering 12 of indeterminate length which is imprinted with a repeating decorative pattern 14. Each of the borders 10 includes a substantially straight, upper aligning edge 16 and a substantially straight lower edge 18. A nonlinear score line 20 consisting of perforations is cut in the border 10 between the aligning edge 16 and the repeating pattern 14. The score line 20 is also cut in a repeating pattern corresponding to the repeating decorative design 14. Accordingly, a portion 22 of the border 10 is defined between the score line 20 and the aligning edge 16. In the border of FIG. 2, an additional score line 24 consisting of perforations is cut between the repeating design 14 and the lower edge 18. The score lines 20, 24 are cut in the border 10 by the laser cutter in a process disclosed in the aforementioned U.S. patent application Ser. No. 08/100,445. The reverse side (that is, the side of the border 10 opposite this side that the decorative designs 14 are imprinted) may be coated with a pressure sensitive adhesive that permits the borders 10 to be mounted on a wall, and then peeled off and repositioned.

Figure 3:
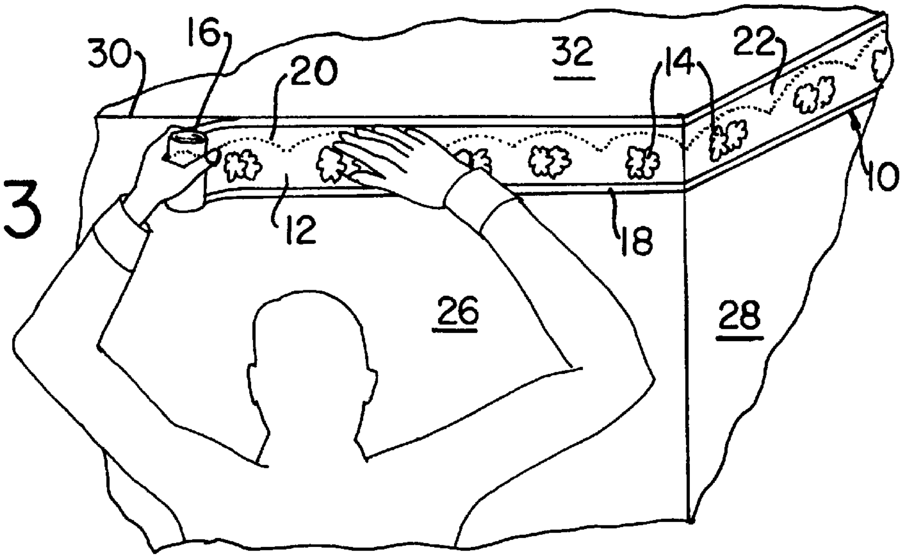
FIG. 3 is a view in perspective illustrating the manner in which the border is applied to the upper edge of walls.
Figure 4:
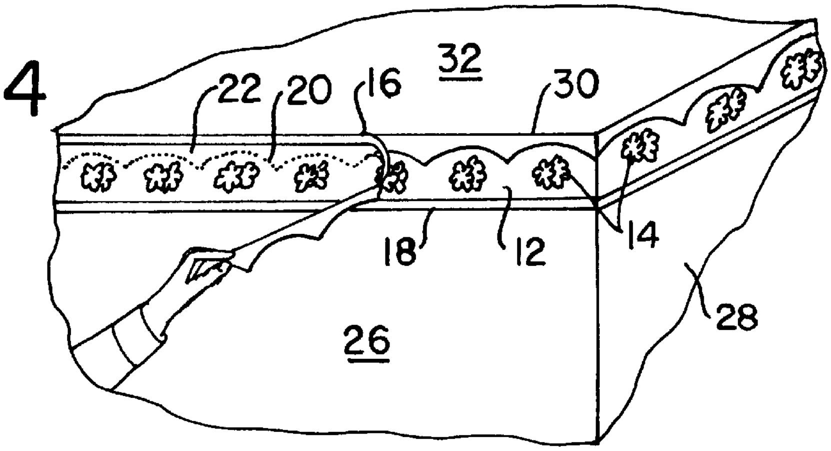
FIG. 4 is a view similar to FIG. 3 but illustrating the manner in which a portion of the wallpaper border between the straight edge thereof the decorative pattern is removed after installation of the border on the wall.

Referring now to FIG. 3, the border 10 is applied to room side walls 26, 28 in the conventional manner by aligning the aligning edge 16 the border 10 with the corner 30 formed between the side walls 26 or 28 and the ceiling 32. The border 10 is then pressed in place as illustrated in FIG. 3. The side of the border opposite that which is imprinted with the repeating pattern 14 can be coated with a pressure sensitive adhesive, or the border can also be applied by using other adhesives, such as standard wallpaper paste. The portion 22 is then removed by tearing along the perforations 20, thereby leaving the scalloped upper edge of the border 10, which provides a different and more interesting visual effect than that of prior art wallpaper borders in which at a substantially straight upper aligning edge which was applied in engagement with the corner 30. If the border illustrated in FIG. 2 is used, the portion 34 defined between the score line 24 the lower edge 18 of the border 10 is also removed, thereby removing all straight lines from the edges of the border, yet providing a different and more interesting visual effect in which the border is spaced from the corner 30 between the ceiling and the walls and both the upper and lower edges of the border are defined by scalloped lines. Preferably, the side of the border 10 which is applied against the wall is coated with the aforementioned pressure sensitive adhesive permits the border 10 to be repositioned and automatically releases to permit the portions 22 or 30 to be torn away as illustrated in FIG. 4. If conventional wallpaper paste is used, the portion 22 must be torn away before the wallpaper fully dries.

I claim:

1. Method of applying a decorative wallcovering border to the edge of a wall adjoining an adjacent wall surface, the edge of said wall adjoining said adjacent wall surface at substantially a straight corner, comprising the steps of providing a wallcovering border bearing a repeating decorative pattern on one side thereof, said border having an indeterminate length and a substantially straight aligning edge along the length of the border, mounting said border on said wall with the straight edge of the border engaging said corner to thereby align the border on said wall using the engagement between the aligning edge of the border and said corner to position said border on the wall in a properly aligned position, and then removing a portion of the border including said aligning edge from the wall while leaving the remainder of the border affixed to said wall.

2. Method of applying a decorative wallcovering as claimed in claim 1, wherein said method includes the steps of scoring a continuous score line extending longitudinally along said border to facilitate removal of said portion.

3. Method of applying a decorative wallcovering as claimed in claim 2, wherein said score line is scored in a repeating pattern along the length of the border.

4. Method of applying a decorative wallcovering as claimed in claim 2, wherein said repeating decorative pattern is imprinted on said wallcovering separated from said straight edge, said score line being scored between said pattern and said straight edge.

5. Method of applying a decorative wallcovering as claimed in claim 4, wherein said border has another substantially straight edge along the length of the border opposite said aligning edge, said method including the step of removing a section of said border between said other edge and said decorative pattern.

6. Method of applying a decorative wallcovering as claimed in claim 5, wherein said method includes the step of scoring a score line along the length of the border between the other edge and said decorative pattern to facilitate removal of said section.

7. Method of applying a decorative wallcovering as claimed in claim 4, wherein said method includes the step of applying a pressure sensitive adhesive on the other side of said border to secure said border to the wall while permitting said portion to peal away from said wall.

8. Method of applying a decorative wallcovering as claimed in claim 2, wherein method includes the step of applying a pressure sensitive adhesive on the other side of said border to secure said border to the wall while permitting said portion to peal away from said wall.

9. Method of applying a decorative wallcovering border to a first surface adjoining an adjacent surface at substantially a corner, comprising the steps of providing a wallcovering border bearing a repeating decorative pattern on one side thereof, said border having an intermediate length, a substantially straight aligning edge along the length of the border and a bottom edge along the length of said border opposite said aligning edge, mounting said border with the straight aligning edge of the border engaging said corner to thereby align the border with said corner using the engagement between the aligning edge of the border and said corner to position said border on the wall in a properly aligned position, and then removing a portion of the border including said aligning edge from the wall while leaving the remainder of the border affixed to said wall.

10. Method of applying a decorative wallcovering as claimed in claim 9, wherein said border includes a continuous score line extending longitudinally along said border between said edges to facilitate removal of said portion.

11. Method of applying a decorative wallcovering as claimed in claim 10, wherein said score line is scored in a repeating pattern along the length of the border.

12. Method of applying a decorative wallcovering as claimed in claim 10, wherein said repeating pattern is imprinted on said wallcovering.

13. Method of applying a decorative wallcovering as claimed in claim 12, further including the step of removing a section of said border including said bottom edge.

14. Method of applying a decorative wallcovering as claimed in claim 13, wherein said border further includes a second score line along the length of the border.

15. Method of applying a decorative wallcovering as claimed in claim 10, wherein said border further includes a pressure sensitive adhesive on the other side of said border.

16. Method of applying a decorative wallcovering as claimed in claim 14, wherein said border further includes a pressure sensitive adhesive on the other side of said border.

* * * * *